I. W. LITTLE.
REIN-HOLDER.

No. 174,545. Patented March 7, 1876.

Witnesses:
Henry W. Brusher
Henry E. Bathrick

Inventor:
Isaac W. Little
per Edw. Dummer
Atty

UNITED STATES PATENT OFFICE.

ISAAC W. LITTLE, OF NEWBURY, MASSACHUSETTS.

IMPROVEMENT IN REIN-HOLDERS.

Specification forming part of Letters Patent No. 174,545, dated March 7, 1876; application filed October 13, 1875.

*To all whom it may concern:*

Be it known that I, ISAAC W. LITTLE, of Newbury, in the county of Essex and State of Massachusetts, have invented a new and useful Improvement in Rein-Holders, which improvement is fully set forth in the following specification, reference being had to the accompanying drawings.

My invention consists in one or two bars or levers, each pivoted at one end to the shaft, axle of a carriage, or body of a carriage or sleigh, so that, on being dropped, as to the other end, to the ground, and connected with a rein, it shall maintain a hold against a forward movement of the horse and carriage or sleigh; and also consists in the parts and attachments for shortening the bar or lever to compensate for a slight movement of the carriage or sleigh, and for holding the bar or lever in position and connecting it with the rein.

Figure 1:
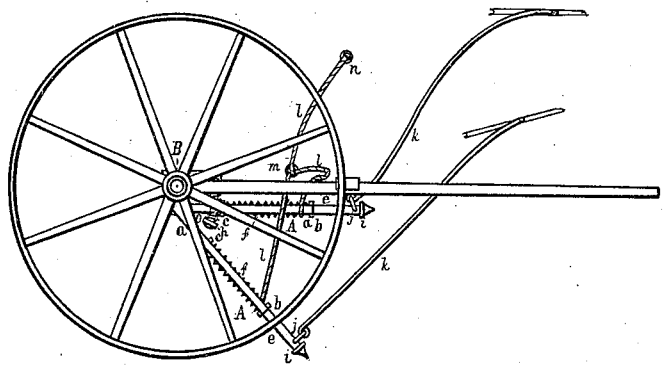
Figure 2:
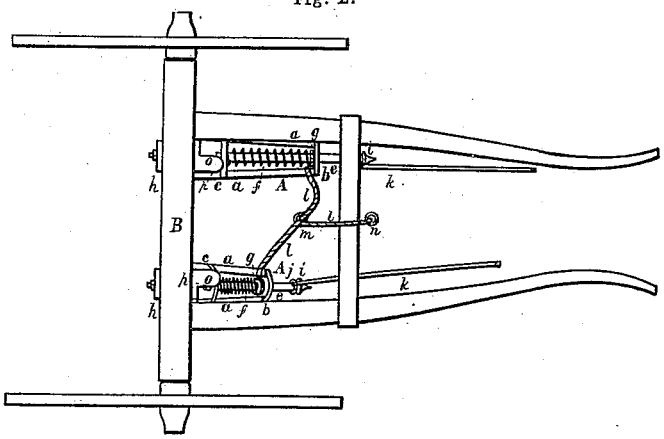
Figure 3:
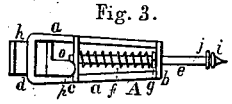
Figure 4:
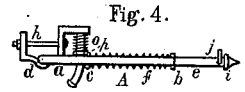

In the drawings, Figure 1 shows so much of a carriage as is necessary to illustrate my invention, with my device as attached thereto, one of the two bars or levers being down in position for holding, and the other drawn up toward the shaft. Fig. 2 is a plan view of Fig. 1. Fig. 3 is a plan view of one of the bars or levers, with its connections. Fig. 4 is a side view of parts in Fig. 3.

The body of the bar or lever A I prefer to so form as to have the two side pieces $a\ a$ connected at or near one end by the cross-piece $b$, and further connected by another cross-piece, $c$, nearer the other end, and at this end to have the cross-portion $d$ to form part of the hinge at which the lever is to swing. One longitudinal piece might be used, in which case there would be stands in place of the cross-pieces $b$ and $c$. The cross-pieces $b$ and $c$ have holes in them to form bearings for the sliding rod $e$, which has a short sliding movement, to allow for a slight motion for the carriage or sleigh. It has wound about it the spiral spring $f$, which bears at one end against the cross piece $c$, and at the other against a collar or pin, $g$, fastened to the rod $e$, so as to carry the latter outward as far as the pin or stop $g$, coming against the cross-piece $b$, will allow. The whole bar or lever A is pivoted to shaft, axle, or carriage, or sleigh body by the clasp or stand $h$. I have shown clasps $h\ h$, as fastened to the axle B, being bolted to the same by the two flanges of each, as shown.

I prefer to use two bars or levers, A A, attached to carriage or sleigh at some distance from each other, to hold both reins, and in the same relation to the shafts. Thus attached, when not in use for holding, they will be swung upward toward the shafts, and when holding, they will be dropped down, so that the lower ends of rods $e\ e$ will touch the ground. The ends of the rods $e\ e$ are made pointed, to hold on the smoother surfaces, while collars $i\ i$ are formed on them near the ends to keep the rods from penetrating soft ground too far. Above the collars $i\ i$ are the rings $j\ j$, a convenient device for attaching the straps $k\ k$; though these straps might be connected to other parts of the bars or levers A A, bearing in mind that the nearer they are fastened to the lower ends of the levers the greater will be the draft on a forward movement of the carriage. The straps $k\ k$ are kept fastened at the other ends to the reins by a suitable device of buckles or rings, and, as I prefer, back of the saddle. At suitable places on the levers A A are fastened the straps or cords $l\ l$, which unite at $m$, where there is a loop or ring, $m$, which hooks onto a suitable projection in any desirable position at the forward part, inside or out, of the carriage or sleigh, to hold the levers up when traveling. The cords are further continued as one to the loop or ring $n$, which hooks in a similar manner when the levers have been dropped into position to hold, so as to keep the cords in position to be readily grasped for raising the levers. In some suitable position are placed the standards holding the spiral springs $o\ o$, and the sliding collars $p\ p$, against which the springs press. The levers, being brought up against the collars $p\ p$, are held firmly by the pressure of the springs $o\ o$, so as not to rattle with the motion of traveling.

The parts having been arranged as shown and described, the levers drawn up toward the shafts, and the straps $k\ k$ attached to the reins, as mentioned, when it is desirable to hold the horse, I have only to unhook the ring or loop $m$, and hook the ring or loop $n$, when the lower ends of the levers A A will drop to the ground and hold thereon, and by the straps k k and reins against any great forward movement of the horse. When about to drive on, the reverse act of unhooking and hooking the rings n and m is only required, when the levers are raised to be held securely.

By showing the levers as connected with an axle, I do not wish to confine the use of my invention to a carriage, for the levers might be connected in a similar manner to the shafts or directly to the body of a sleigh.

I claim as my invention—

1. The bar or lever A, pivoted at one end to a carriage or sleigh, and formed at the other end, to hold on the ground, and having the sliding or compensating rod $e$, in combination with a strap, $k$, for connecting said bar with a rein, all substantially as and for the purpose hereinbefore set forth.

2. The combination of one or two longitudinal pieces, $a$, pivot $d$, rod $e$, spring $f$, and strap $k$, substantially as and for the purpose hereinbefore set forth.

3. The bar or lever A, standard and spring $o$, combined with a carriage or sleigh, substantially as and for the purpose hereinbefore set forth.

4. The combination or the bar or lever A, pivoted at $d$, strap $k$, and cord or strap $l$, substantially as and for the purpose hereinbefore set forth.

ISAAC W. LITTLE.

Witnesses:
   EDW. DUMMER,
   ABBY P. LITTLE.